United States Patent
Li et al.

(10) Patent No.: US 9,513,983 B2
(45) Date of Patent: Dec. 6, 2016

(54) METHOD FOR MAINTAINING FILE SYSTEM OF COMPUTER SYSTEM

(71) Applicant: Synology Incorporated, Taipei (TW)

(72) Inventors: Chung-Cheng Li, Taipei (TW); Chien-Kuan Yeh, New Taipei (TW); Shih-Hsien Liu, New Taipei (TW)

(73) Assignee: Synology Incorporated, Taipei (TW)

( * ) Notice: Subject to any disclaimer, the term of this patent is extended or adjusted under 35 U.S.C. 154(b) by 159 days.

(21) Appl. No.: 14/279,299

(22) Filed: May 15, 2014

(65) Prior Publication Data

US 2015/0074455 A1 Mar. 12, 2015

(30) Foreign Application Priority Data

Sep. 12, 2013 (TW) .............................. 102133009 A

(51) Int. Cl.
*G06F 11/00* (2006.01)
*G06F 11/07* (2006.01)
*G06F 11/32* (2006.01)

(52) U.S. Cl.
CPC ......... *G06F 11/0769* (2013.01); *G06F 11/076* (2013.01); *G06F 11/0727* (2013.01); *G06F 11/0793* (2013.01); *G06F 11/327* (2013.01); *G06F 2201/81* (2013.01)

(58) Field of Classification Search
CPC .................. G06F 11/0769; G06F 11/0793
See application file for complete search history.

(56) References Cited

U.S. PATENT DOCUMENTS

| 5,664,095 A | 9/1997 | Cox |
| 6,944,793 B1 * | 9/2005 | Parker ................. G06F 11/3006 702/188 |
| 2002/0087914 A1 | 7/2002 | Sarra |
| 2005/0005204 A1 * | 1/2005 | Kobayashi .......... G06F 11/0769 714/48 |

(Continued)

FOREIGN PATENT DOCUMENTS

| TW | M388066 | 9/2010 |
| TW | M445732 | 1/2013 |
| TW | M461273 | 9/2013 |

OTHER PUBLICATIONS

Gabriele Pohl, Prevention rather than crash, Oct. 1, 2004, XP055174319, URL: http://www.linux-community.de/Internal/Artikel/Print-Artikel/LinuxUser/2004/10/Die-Zuverlaessigkeit-von-Festplatten-ueberwachen-mit-smartmontools, Translated by Google Chrome ver. 43.0.2357.81 m.

(Continued)

*Primary Examiner* — Yolanda L Wilson
(74) *Attorney, Agent, or Firm* — Winston Hsu; Scott Margo

(57) ABSTRACT

A method for maintaining a file system of a computer system is disclosed. An operating system is loaded to the computer system when the computer system is booted, such that the file system of the computer system is monitored in real time after the computer system is booted. When occurrence of an error in the file system is detected, a number of times the error has occurred is accumulated. When the number of times the error has occurred reaches a predetermined threshold, a notification message is generated and displayed on an electronic apparatus. Accordingly, a manager of the computer system may be notified immediately when the occurrence of the error in the file system is detected.

9 Claims, 3 Drawing Sheets

(56) References Cited

U.S. PATENT DOCUMENTS

| | | | | |
|---|---|---|---|---|
| 2005/0246612 | A1* | 11/2005 | Leis | G06F 11/0727 |
| | | | | 714/763 |
| 2006/0130071 | A1* | 6/2006 | Martin | G06F 11/0748 |
| | | | | 719/319 |
| 2008/0109685 | A1* | 5/2008 | Crawley | G06F 11/0727 |
| | | | | 714/48 |
| 2009/0089628 | A1* | 4/2009 | Day | G06F 11/0727 |
| | | | | 714/54 |
| 2010/0115348 | A1* | 5/2010 | Gilluwe | G06F 17/30386 |
| | | | | 714/57 |
| 2012/0159255 | A1* | 6/2012 | Havewala | G06F 11/0727 |
| | | | | 714/37 |
| 2013/0110789 | A1* | 5/2013 | Braam | G06F 11/1435 |
| | | | | 707/675 |
| 2014/0201163 | A1* | 7/2014 | Tipton | G06F 11/14 |
| | | | | 707/686 |

OTHER PUBLICATIONS

Weaver, Linux: Trigger a real-time alarm on a low disk space condition, May 7, 2012, pp. 1-3, XP055174329, URL: http://serverfault.com/questions/386784/linux-trigger-a-real-time-alarm-on-a-low-disk-space-condition.

Marshall Kirk McKusick, Running "Fsck" in the Background, Proceedings of the BSDCon 2002 Conference, Feb. 11-14, 2002, XP061009575, The USENIX Association, San Francisco, California, USA.

* cited by examiner

| Relevant parts of the file system | Event | Predetermined threshold |
|---|---|---|
| Multiblocks | Error reading block bitmap | 1 |
| | Error loading buddy information | 2 |
| | Freeing blocks in system zone | 3 |
| Multiple Mount Protection ; MMP | Error writing to MMP block | 5 |
| | Error reading MMP data | 1 |
| Blocks | Checksum bad for group | 3 |
| | Invalid block bitmap | 10 |
| | Cannot read block bitmap | 10 |
| Inodes | Reserved or nonexistent inode | 5 |
| | Bit already cleared for inode | 5 |
| ... | ... | ... |

METHOD FOR MAINTAINING FILE SYSTEM OF COMPUTER SYSTEM

BACKGROUND OF THE INVENTION

1. Field of the Invention

The present invention relates to a method for maintaining a file system of a computer system, and more specifically, to a method for timely notifying a user to fix errors of a file system.

2. Description of the Prior Art

A file system is a system for managing files of a computer system and is used to efficiently conduct storage, search and update operations of files in the computer system. However, there are many reasons, i.e. power outage, hardware (such as CPU, memory, hard drive, etc.) error, operating system bug, etc., that can cause an error of the file system. Many file systems of operating systems use "error continue" as a mode of operation. When an error occurs in a file system, the file system continues to operate without having to deal with the error. Thus, as the file system accumulates errors from running for a prolonged time, the file system may not be repaired due to the accumulated errors or may need to stop all operations of the computer system and reboot to repair the file system.

In the prior art, the kernel of the Linux operating system may approach the errors in EXT4 file system in three ways:
(a). remount the file system, and the file system is set to read only;
(b). generate kernel panic; and
(c). error continue.

Wherein, approach (a) will keep problems resulted from subsequent write operations of the file system being worse, but the file system would be not updatable; approach (b) will completely stop the entire operating system and the computer system must be rebooted; approach (c) will, as described above, accumulate the errors in the file system. When the errors of the file system continuously accumulate, the file system may not be used properly or not be able to back up data in the file system and result to having corrupt files.

When the file system accumulates excessive number of errors causing the files system not be able to operate normally, the prior art usually restarts the computer system to solve the problem. For example, when a computer system having an Ubuntu® operating system is booting up, there are three ways to determine whether there is a need to conduct file system inspection:
(1) Determine whether unmount is normal: When the file system did not unmount properly during the last shut down of the computer system, the file system may be damaged and an inspection of the file system is needed.
(2) Check the number of mount times: When the number of mount times exceeds a predetermined threshold, an inspection of the file system would be conducted.
(3) Setting the inspection time period: For a file system being rarely remounted or a computer system being rarely rebooted, a time period is set, and when the time from the last file system inspection exceeds the set time period, a file system inspection is conducted.

In addition, the Windows® operating system of Microsoft® may be taken as an example. Such type of computer system will conduct a file system inspection during a reboot after a normal shut down and the administrator may carry out the file system inspection while the computer system is turned on. However, whether the inspection is manually initiated or initiated by error encountered during boot, the computer system lack a mechanism for processing errors encountered at real time. In other words, when the computer system of prior art finds an error in the file system, the error is not immediately responded to, and the problem of the file system will continuously expand until the computer system is rebooted.

However, a computer system requiring a more stable service reboot more rarely, therefore, inspecting the file system during reboot is improper to apply to high-end server. Furthermore, manually inspecting the file system is unsubstantial because the administrator would not know when to inspect the file system. In addition, the current Windows® operating system does not suggest a file system inspection to the administrator.

SUMMARY OF THE INVENTION

An embodiment of the present invention presents a method of maintaining a file system of a computer system. The method comprises loading an operating system when booting up the computer system; monitoring the file system of the computer system in real-time; accumulating a number of times the error occurs when occurrence of an error in the file system is detected; and generating a notification message and displaying the notification message on an electronic apparatus when the accumulated number reaches a predetermined threshold.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 illustrates a schematic diagram of the event table according to an embodiment of the present invention.

DETAILED DESCRIPTION

Figure 1:
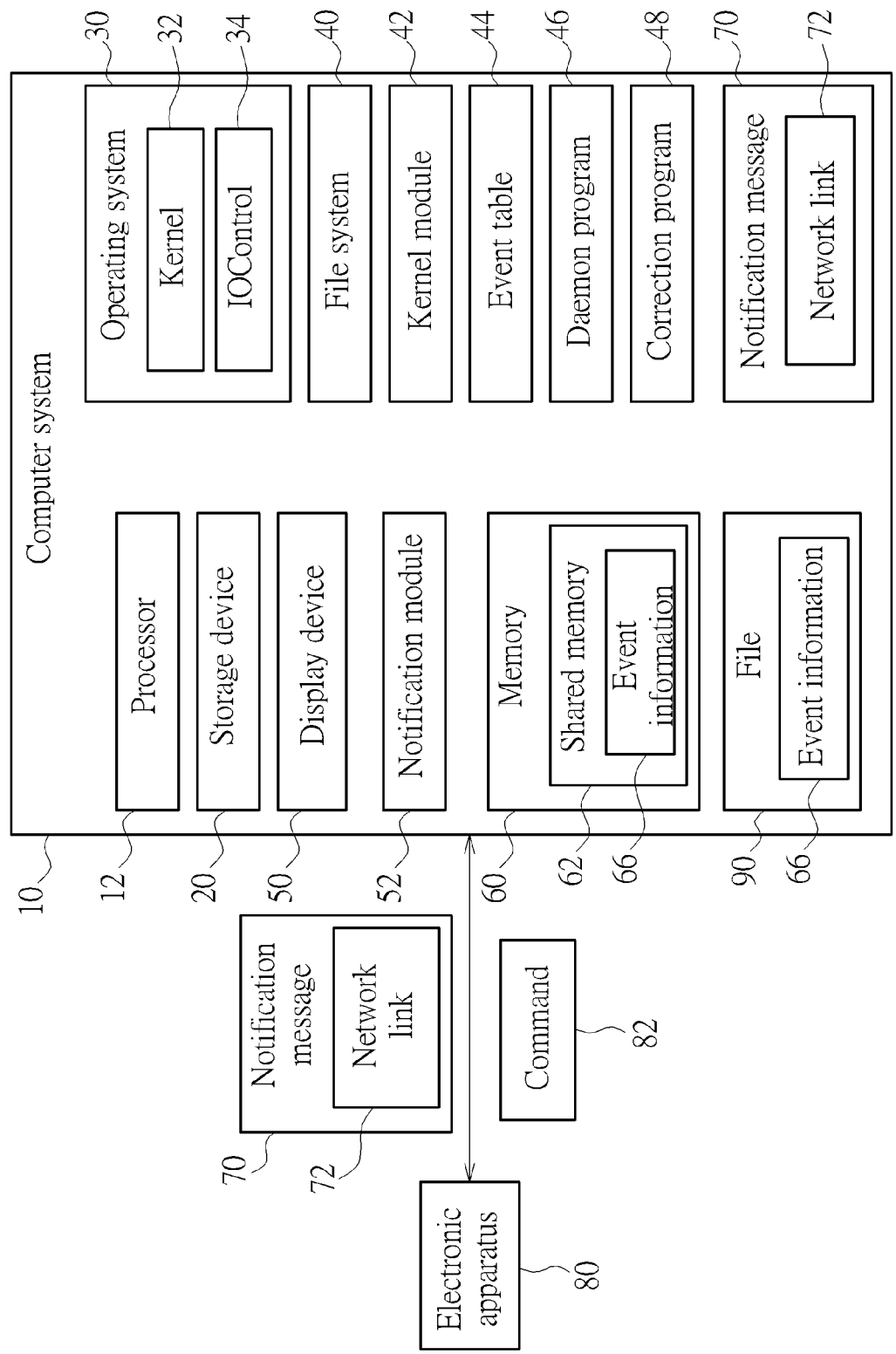
FIG. 1 illustrates a block diagram of a computer system according to an embodiment of the present invention.

Please refer to FIG. 1. FIG. 1 illustrates a block diagram of a computer system 10 according to an embodiment of the present invention. The computer system 10 comprises a processing unit 12, a storage device 20, an operating system 30, a file system 40 and a memory 60. The processing unit 12 may be configured to interpret and execute commands of the computer system 10 and process data of each of the softwares of computer system 10. The storage device 20 is configured to store data and files of the operating system 30, file system 40, daemon 46, correction program 48 etc. The storage device 20 may be a hard drive, a solid state driver, a rewritable disc or any media having data storage capability. The operating system 30 is loaded when the computer system 10 is booting up, and the operating system 30 is configured to manage hardware and software resources of the computer system 10. The operating system 30 handles operations such as managing and configuring of the memory 60, determining the priority of system resources, controlling of input and output devices, operating of the network, managing file system 40 and other basic operations. The operating system 30 may be, but is not limited to, a Linux operating system or Windows® operating system of Microsoft®. The file system 40 may be configured to manage structure or protocol of the files stored in the storage device 20 and to store the information, code and directory or file type in the storage device 20. The file system 40 may be a part of the operating system 30. The operating system 30 may use the file system 40 to set the format used by the storage device 20 in response to various user/application requests to complete file operations such as file open, file read, file write and file close. Generally, when the computer system 10 boots up, the processing unit 12 may load the operating system 30 and file system 40 stored in the storage device 20 into the memory 60 and execute the operating system 30 and file system 40. As for Linux operating system, when the computer system 10 loads the operating system 30, the processing unit 12 may execute a mount command to mount the file system 40, such that the mounted file system 40 would manage the storage device 20.

Figure 2:
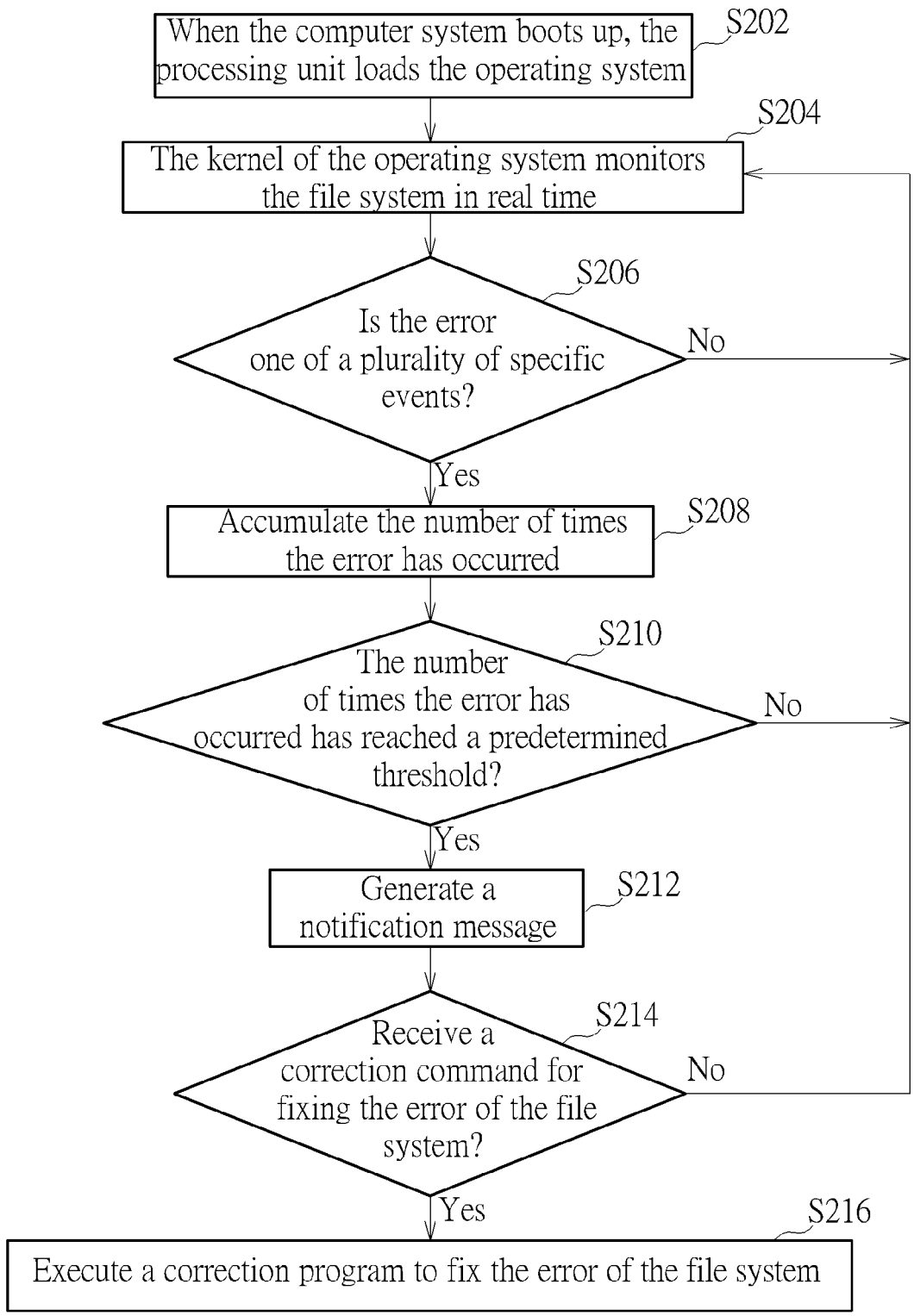
FIG. 2 illustrates a flowchart of a method of maintaining the file system of the computer system in FIG. 1 according to an embodiment of the present invention.

Please refer to FIG. 2 in reference to FIG. 1. FIG. 2 illustrates a flowchart of a method of maintaining the file system 40 of the computer system 10 in FIG. 1 according to an embodiment of the present invention. According to the embodiment of the method of maintaining the file system 40 of the computer system 10, when the computer system 10 is turned on (boots up), the processing unit 12 may load the operating system 30 (Step S202), such that the operating system 30 may manage the hardware and software resources of the computer system 10. Afterwards, the processing unit 12 may monitor the file system 40 of the computer system 10 in real-time using a kernel 32 of the operating system 30, such that errors of the file system 40 may be detected in real-time. When the kernel 32 of the operating system 30 detects an error of the file system 40 (Step S204), the processing unit 12 may execute a daemon program (resident program) 46 to determine if the error is one of a plurality of specific events (Step S206). Wherein, the plurality of specific events may be recorded in an event table 44 of the computer system 10. The daemon program 46 may use the event table 44 to determine if the error is a specific event that needs to be reported. If it is determined that the error is one of the plurality of specific events, the daemon program 46 may accumulate the number of times the error has occurred (Step S208) and determine if the number of times the error has occurred has reached a predetermined threshold (Step S210). In an embodiment of the present invention, the daemon program 46 may set a counter for each type of error that may occur in the file system 40 to cumulatively count the number of times each error has occurred. In another embodiment of the present invention, the number of times each error has occurred is recorded in the event table 44. Furthermore, the predetermined threshold may be set in the event table 44, and each error may have a corresponding predetermined threshold. The daemon program 46 may perform a query in the event table 44 for the detected errors to obtain the corresponding predetermined thresholds so as to perform the determination in Step S208. When the accumulated number of times has reached the predetermined threshold, the daemon program 46 may generate a notification message 70 (Step S212). The notification message 70 may be displayed in an electronic apparatus to notify the administrator to do something. The electronic device displaying the notification message 70 may be a display device 50 of the computer system 10 or a separate electronic device 80. Wherein, the electronic apparatus 80 may be a mobile phone, a tablet, a personal computer or other devices. The notification message 70 may be an electronic mail, a chat message or a short message service (SMS) message and may include all information corresponding to the error for reference of the administrator. Furthermore, the notification message 70 may be directly generated by the daemon program 46 or the daemon program may call to other functions or libraries to generate the notification message 70.

After the daemon program 46 sends out the notification message 70, the daemon program 46 waits a user to respond to the notification message 70 and determines if the response received from the user is a correction command 82 to fix the error of the file system 40 (Step S214). When the user responds to the notification message 70 with the correction command 82, in response to the correction command 82, the daemon program 46 may use the operating system 12 to notify the processing unit 12 to execute a correction program 48 and fix the error of the file system 40 (Step S216). After fixing the error, the number of times the error has occurred is reset to zero. Furthermore, in an embodiment of the present invention, when performing step S216, aside from fixing the error, other errors that have detected but have not been fixed would be fixed simultaneously and resetting the numbers of times of the corresponding fixed errors to zero. It should be noted that, when executing step S216, the computer system 10 does not need to reboot. Therefore, while the error of the file system 40 is being fixed, the computer system 10 may continuously operate and other services that do not require the use of the files system 40 are not interrupted. For Windows® operating system, the correction program 48 may be a program named "Chkdsk". And for Linux operating system, the correction program 48 may be a program named "fsck".

Furthermore, in the abovementioned embodiments, the daemon program 46 performs determination and accumulation of number of times in steps S206 to S210. However, the present invention is not limited thereto. For example, in another embodiment of the present invention, the kernel 32 may perform the determination in steps S206 and S210 and accumulation of number of times in step S208. Wherein, after the kernel 32 determines that the accumulated number of times the error has occurred has reached the predetermined threshold in step S210, the daemon program 46 generates the notification message 70 (Step S212).

Please refer to FIG. 3. FIG. 3 illustrates a schematic diagram of the event table 44 according to an embodiment of the present invention. As mentioned previously, the event table 44 may be configured to record the corresponding predetermined threshold of each of the errors. Each of the errors may have different predetermined threshold from each other. Taking the EXT4 file system of the Linux operating system as an example, the EXT4 file system approximately has forty possible errors and a corresponding predetermined threshold of each of the errors may be set according to a severity level of the error. When performing step S206, the daemon program 46 or the kernel 32 may use the event table 44 as a basis in determining if the detected error is one of the plurality of specific events. The steps S208 to S216 may only be performed when the detected error is one of the plurality of specific events. Furthermore, some errors of the file system 40 may not affect the operations of the file system 40 and, therefore, may not be included in the event table 44. When a detected error does not affect the operations of the file system 40, the daemon program 46 does not need to generate the notification message 70. In an embodiment of the present invention, for the sake of facilitating retrieval, the event table 44 of a computer system having a Linux operating system may classify errors according to event and relevant parts of the file system 40. Taking the Linux operating system as an example, relevant parts of the file system 40 may include multiblocks, Multiple Mount Protection (MMP), blocks, inodes, etc. Furthermore, taking the Linux operating system as an example, the errors recorded in the event table 44 may include: error reading block bitmap, error loading buddy information, freeing blocks in system zone, error writing to MMP block, error reading MMP data, checksum bad for group, invalid block bitmap, cannot read block bitmap, reserved or nonexistent inode, bit already cleared for inode, etc. Each of the plurality of specific events listed in the event table 44 may be set with a corresponding predetermined threshold. The daemon program 46 may individually determine if the accumulated number of times each of the plurality of specific events has reached the corresponding predetermined threshold. For example, if a detected error is the aforementioned "Error loading buddy information", when the "Error loading buddy information" has occurred two times, the daemon program 46 may generate the notification message 70. Another example, if a detected error is the aforementioned "error reading MMP data", when the "error reading MMP data" has occurred one time, the daemon program 46 may generate the notification message 70.

Please refer to FIG. 2, in an embodiment of the present invention, the step S206 may be omitted. In other words, when a detected error is not included in the plurality of specific events in the event table 44, steps S208 to S216 may still be executed. More specifically, in the embodiment, when the kernel 32 of the operating system 30 found an error in the file system 40, the kernel 32 or the daemon program 46 may accumulate the number of times the error has occurred (Step 208) and determine if the number of times the error occurred has reached the predetermined threshold (Step S210). When the number of times the error occurred has reached the predetermined threshold, the daemon program 46 may generate the notification message 70 (Step S212). Thus, in the embodiment, steps S208 to S210 may be performed when any type of error occurs in the file system 40.

Please refer to FIG. 1 and FIG. 2. To facilitate an immediate response to the notification message 70 from the administrator, in an embodiment of the present invention, the daemon program 46 may generate the notification message 70 (Step S212) having a network link 72 embedded into the notification message 70. Thus, when the display apparatus 50 or the electronic apparatus 80 displays the notification message 70, the administrator may select the network link 72 in the notification message 70, such that the computer system 10 or electronic apparatus 80 may be triggered to generate the correction command 82 and inform the computer system 10 to execute the correction program 48 to fix the error in the file system 40. Furthermore, in another embodiment of the present invention, the user interface configured to display the notification message 70 may also display a button. And when the administrator selects the button, the correction command 82 may be generated.

Please refer to FIG. 1. In an embodiment of the present invention, the processing unit 12 may embed the kernel module 42 into the kernel 32 of the operating system 30 when the computer system 10 boots up, and the processing unit 12 may execute the daemon program 46 after boot has finished. The kernel module 42 may be stored in the storage device 20, and the processing unit 12 may read the kernel module 42 from the storage device 20 and embed the kernel module 42 into the kernel 32 of the operating system 30. When the kernel 32 detects an error of the file system 40 in step S206, the kernel module 42 may transmit and store event information 66 of the detected error to the shared memory 62 of the computer system 10. The daemon program 46 may check if the event information 66 of the error is stored in the shared memory 62 at a predetermined time period (i.e. 1 minute, 5 minutes). If the event information 66 has stored in the shared memory 62, then, the daemon program 46 may read the event information 66 from the shared memory 62 and determine if the detected error is one of the plurality of specific events according to the event information 66. Accordingly, the event information 66 may be transmitted from the kernel space to the user space, and the daemon program 46 of the user space may be executed to perform related operations (i.e. steps S206 to S216) according to the event information 66.

Furthermore, settings of transmission time of the event information to the shared memory 62 may be different based on different embodiments. For example, in another embodiment of the present invention, the kernel 32 may perform determination in steps S206 and S210 and accumulation of number of times in step S208. And when the kernel 32 in step S210 determines the accumulated number of times has reached the predetermined threshold, the kernel module 42 may transmit and store the event information 66 of the error to the shared storage 62 of the computer system 10. Afterwards, the daemon program 46 may read the event information 66 from shared memory 62 and, according to the event information 66, performing Step S212 and generate the notification message 70.

For the daemon program 46 to obtain the event information 66, aside from being obtained through the shared memory 62, the event information 66 may be obtained through a file 90 of the computer system 10. More specifically, the kernel module 42 may transmit and store the event information 66 of all of the detected errors to the file 90 and the daemon program 46 may obtain the event information 66 from the file 90. Taking Linux operating system as an example, the event information 66 may be transmitted and stored in the file 90 using process pseudo-file system (PROCFS) or system pseudo-file system (SYSFS). Furthermore, in another embodiment of the present invention having Linux as the operating system, the operating system 30 may further comprise IOControl function (ioctl) 34 and the daemon program 46 may obtain the event information 66 from the kernel 32 through the IOControl function 34.

In summary, the present invention discloses a method of maintaining a file system of a computer system. When a kernel of an operating system found an error has occurred in a file system, a notification message corresponding to the error may be transmitted to a user to facilitate a response. The notification message may be displayed on a display device of the computer system or transmitted to a separate electronic apparatus to recommend the user to use an appropriate correction program to fix the error of the file system. And because the user may send a command to fix the error using the separate electronic device (i.e. mobile phone), the repair of the file system may be remotely triggered. As a result, the error in the file system may be fixed immediately and avoid being corrupted due to excessive number of error accumulated.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of maintaining a file system of a computer system, comprising:

when booting up the computer system, loading an operating system;
monitoring the file system of the computer system;
when occurrence of an error in the file system is detected, accumulating a number of times the error occurs;
when the accumulated number reaches a predetermined threshold, generating a notification message and embedding a network link into the notification message;
displaying the notification message on an electronic apparatus which is separate from the computer system;
in response to selection of the network link embedded into the notification message displayed on the electronic apparatus, the electronic apparatus generating a correction command; and
in response to the correction command received from the electronic apparatus, the computer system implementing a correction program to correct the error of the file system.

2. The method of claim 1, further comprising:
before accumulating the number of times the error occurs, determining if the error is one of a plurality of specific events.

3. The method of claim 1, further comprising:
executing a daemon program;
wherein the number of times the error occurs is accumulated through the daemon program, and the notification message is generated by the daemon program.

4. The method of claim 1, further comprising:
executing a daemon program;
wherein the number of times the error occurs is accumulated through a kernel of the operating system, and the notification message is generated by the daemon program.

5. The method of claim 4, further comprising:
obtaining event information of the error by the daemon program from the kernel through an IOControl function of the operating system.

6. The method of claim 1, wherein the operating system is a Linux operating system and the file system is an EXT4 file system.

7. The method of claim 1, wherein the notification message is an e-mail, a chat message, or an SMS (short message service) message.

8. A method of maintaining a file system of a computer system, comprising:
when booting up the computer system, loading an operating system;
monitoring the file system of the computer system;
embedding a kernel module into a kernel of the operating system;
executing a daemon program;
when occurrence of an error in the file system is detected, accumulating a number of times the error occurs through the kernel of the operating system;
when the accumulated number reaches a predetermined threshold, the kernel module sending event information of the error to a shared memory of the computer system;
the daemon program reading the event information of the error from the shared memory and generating a notification message according to the event information;
displaying the notification message on an electronic apparatus which is separate from the computer system;
in response to the notification message displayed on the electronic apparatus, the electronic apparatus generating a correction command; and
in response to the correction command received from the electronic apparatus, the computer system implementing a correction program to correct the error of the file system.

9. A method of maintaining a file system of a computer system, comprising:
when booting up the computer system, loading an operating system;
monitoring the file system of the computer system;
embedding a kernel module into a kernel of the operating system;
executing a daemon program;
when occurrence of an error in the file system is detected, accumulating a number of times the error occurs through the kernel of the operating system;
when the accumulated number reaches a predetermined threshold, the kernel module saving event information of the error to a file;
the daemon program reading the event information of the error from the file and generating a notification message according to the event information, wherein a network link is embedded into the notification message;
displaying the notification message on an electronic apparatus which is separate from the computer system;
in response to selection of the network link embedded into the notification message displayed on the electronic apparatus, the electronic apparatus generating a correction command; and
in response to the correction command received from the electronic apparatus, the computer system implementing a correction program to correct the error of the file system.

* * * * *